(12) United States Patent
Goslin et al.

(10) Patent No.: US 10,587,834 B2
(45) Date of Patent: Mar. 10, 2020

(54) SYSTEMS AND METHODS FOR TRACKING OBJECTS FOR AUGMENTED REALITY

(71) Applicant: Disney Enterprises, Inc., Burbank, CA (US)

(72) Inventors: Michael P. Goslin, Burbank, CA (US); Sebastian Janisz, Burbank, CA (US); Matthew Ryan, Burbank, CA (US); Katherine M. Bassett, Burbank, CA (US); Joseph Olson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/451,082

(22) Filed: Mar. 6, 2017

(65) Prior Publication Data

US 2017/0257594 A1   Sep. 7, 2017

Related U.S. Application Data

(60) Provisional application No. 62/304,893, filed on Mar. 7, 2016.

(51) Int. Cl.
*H04N 5/445* (2011.01)
*H04N 5/222* (2006.01)
*G06T 19/00* (2011.01)
*G02B 27/01* (2006.01)

(52) U.S. Cl.
CPC ....... *H04N 5/44504* (2013.01); *G02B 27/017* (2013.01); *G06T 19/006* (2013.01); *H04N 5/2224* (2013.01); *G02B 2027/014* (2013.01); *G02B 2027/0138* (2013.01)

(58) Field of Classification Search
CPC .................................................. H04N 5/44504
USPC ......................................................... 348/584
See application file for complete search history.

(56) References Cited

U.S. PATENT DOCUMENTS

| | | | |
|---|---|---|---|
| 6,162,123 A | 12/2000 | Woolston | |
| 7,719,563 B2 | 5/2010 | Richards | |
| 9,972,138 B2 | 5/2018 | Goslin | |
| 10,223,836 B2 | 3/2019 | Goslin | |
| 10,300,372 B2 | 5/2019 | Goslin | |
| 10,304,251 B2 | 5/2019 | Pahud | |
| 2007/0126700 A1 | 6/2007 | Wright | |
| 2007/0252815 A1 | 11/2007 | Kuo | |
| 2010/0261526 A1 | 10/2010 | Anderson | |
| 2011/0250962 A1 | 10/2011 | Feiner | |

(Continued)

OTHER PUBLICATIONS

Dictionary.com, Defintion of lightsaber, 2019, Dictionary.com, pp. 1-2 (Year: 2019).

(Continued)

*Primary Examiner* — Jefferey F Harold
*Assistant Examiner* — Justin B Sanders
(74) *Attorney, Agent, or Firm* — Esplin & Associates, PC

(57) ABSTRACT

This disclosure relates to systems and methods for tracking objects for augmented reality. Positions and/or orientations of objects, light sources, and/or visual markers may be determined. Visual effects may be determined based on the objects, lights sources, and/or visual markers. Overlay positions and/or overlay orientations for the visual effects may be determined based on the positions and orientations of the objects, light sources, and/or visual markers. An overlay image including the visual effects may be determined and displayed.

18 Claims, 13 Drawing Sheets

(56) References Cited

U.S. PATENT DOCUMENTS

| | | | | |
|---|---|---|---|---|
| 2012/0050535 | A1* | 3/2012 | Densham | H04N 5/2224 348/159 |
| 2012/0262365 | A1 | 10/2012 | Mallinson | |
| 2012/0327117 | A1 | 12/2012 | Weller | |
| 2013/0042296 | A1 | 2/2013 | Hastings | |
| 2013/0044128 | A1 | 2/2013 | Liu | |
| 2013/0229396 | A1* | 9/2013 | Huebner | H04N 9/3147 345/207 |
| 2013/0286004 | A1 | 10/2013 | McCulloch | |
| 2014/0002329 | A1 | 1/2014 | Nishimaki | |
| 2014/0003651 | A1* | 1/2014 | Smoot | G06K 9/00335 382/103 |
| 2014/0078517 | A1* | 3/2014 | Ben-Yishai | A61B 8/4254 356/614 |
| 2014/0080109 | A1 | 3/2014 | Haseltine | |
| 2014/0104169 | A1 | 4/2014 | Masselli | |
| 2014/0160117 | A1 | 6/2014 | Nehmadi | |
| 2015/0035677 | A1 | 2/2015 | Williams | |
| 2015/0201188 | A1* | 7/2015 | Pritch | H04N 13/0404 348/189 |
| 2015/0243286 | A1 | 8/2015 | Goslin | |
| 2015/0248785 | A1 | 9/2015 | Holmquist | |
| 2016/0189411 | A1 | 6/2016 | Matsunaga | |
| 2016/0206957 | A1 | 7/2016 | Goslin | |
| 2016/0247324 | A1 | 8/2016 | Mullins | |
| 2016/0253842 | A1 | 9/2016 | Shapira | |
| 2016/0260261 | A1 | 9/2016 | Hsu | |
| 2016/0274662 | A1 | 9/2016 | Rimon | |
| 2016/0299563 | A1 | 10/2016 | Stafford | |
| 2016/0327798 | A1 | 11/2016 | Xiao | |
| 2017/0087465 | A1 | 3/2017 | Lyons | |
| 2017/0124713 | A1 | 5/2017 | Jurgenson | |
| 2017/0132841 | A1 | 5/2017 | Morrison | |
| 2017/0161561 | A1 | 6/2017 | Marty | |
| 2017/0203225 | A1 | 7/2017 | Goslin | |
| 2017/0213387 | A1 | 7/2017 | Bean | |
| 2017/0228936 | A1 | 8/2017 | Goslin | |
| 2017/0295229 | A1 | 10/2017 | Shams | |
| 2018/0081439 | A1 | 3/2018 | Daniels | |
| 2018/0173300 | A1 | 6/2018 | Schwarz | |
| 2018/0190017 | A1 | 7/2018 | Mendez | |
| 2018/0204362 | A1 | 7/2018 | Tinsman | |
| 2018/0295324 | A1 | 10/2018 | Clark | |
| 2018/0350056 | A1 | 12/2018 | Cardenas Bernal | |
| 2018/0365893 | A1 | 12/2018 | Mullins | |
| 2019/0019346 | A1 | 1/2019 | Cuthbertson | |
| 2019/0243446 | A1 | 8/2019 | Panec | |

OTHER PUBLICATIONS

Virtual and Augmented Reality, Oct. 2016, Citi GPS: Global Perspectives & Solutions. (128 pages).

* cited by examiner

SYSTEMS AND METHODS FOR TRACKING OBJECTS FOR AUGMENTED REALITY

FIELD

This disclosure relates to systems and methods for augmenting an appearance of an object.

BACKGROUND

To augment an appearance of an object with visual effects using augmented reality, the position of the objects must be tracked. Tracking positions of objects for augmented reality may be difficult.

SUMMARY

This disclosure relates to augmenting an appearance of an object. The appearance of an object may be augmented by determining a position of the object. A patterned light source may be carried by the object. The patterned light source may indicate a reference point for the object that facilitates determination of the position of the object. An overlay position for a visual effect may be determined based on the position of the object. The visual effect may be placed within an overlay image according to the overlay position. The overlay image may be displayed on a display so that the visual effect appears to augment the object.

A system that tracks objects for augmented reality may include one or more of a display, an image sensor, one or more physical processors, and/or other components. In some implementations, the image sensor and/or the one or more processors may be carried on the display. The field of view of the image sensor may be a function of the position and/or the orientation of the display, and/or other information.

A patterned light source may be carried by an object. The patterned light source may indicate a reference point for the object that facilitates determination of a position and/or an orientation of the object. The patterned light source may include one or more sources of electromagnetic radiation. In some implementations, the patterned light source may include one or more light emitting diodes. In some implementations, the patterned light source may be configured to generate multiple colors of light. In some implementations, the patterned light source may include a static light pattern. In some implementations, the patterned light source may include a dynamic light pattern.

In some implementations, an orientation sensor may be carried by the object. The orientation sensor may be configured to generate orientation output signals conveying orientation information of the object. In some implementations, an orientation sensor may be carried by the display. The orientation sensor may be configured to generate orientation output signals conveying orientation information of the display. In some implementations, the orientation sensor may include one or more of an accelerometer, a gyroscope, a magnetometer, an inertial measurement unit, a magnetic sensor, a radio-frequency sensor, and/or other orientation sensors.

The display may be configured to display an overlay image and/or other information. The display may include one or more devices that may present information visually. In some implementations, the display may include one or more screens of one or more display devices. In some implementations, the display may include one or more display devices. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The image sensor may be configured to generate visual output signals conveying visual information within a field of view of the image sensor. The image sensor may include one or more of a charge-coupled device sensor, an active pixel sensor, a complementary metal-oxide semiconductor sensor, an N-type metal-oxide-semiconductor sensor, and/or other image sensors.

The one or more physical processors may be configured by machine-readable instructions. Executing the machine-readable instructions may cause the one or more physical processors to facilitate augmenting an appearance of an object. The machine-readable instructions may include one or more computer program components. The computer program components may include one or more of a position and orientation component, a visual effects component, an overlay component, a display component, a light effects component, and/or other computer program components.

The position and orientation component may be configured to determine a position of an object based on the visual output signals. The position and orientation component may determine a position an object based the position of the patterned light source.

In some implementations, the position and orientation component may be configured to determine an orientation of the object based on the orientation output signals. In some implementations, the position and orientation component may be configured to determine an orientation of the display based on the orientation output signals, The visual effects component may be configured to select a visual effect. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects. The visual effects component may be determine an overlay position for the visual effect based on the position of the object.

In some implementations, the visual effect component may determine an overlay orientation for the visual effect based on the orientation of object. In some implementations, the visual effect component may determine an overlay orientation for the visual effect based on the orientation of display.

The overlay component may be configured to determine an overlay image. The overlay image may include a visual effect determined by the visual effects component. The visual effect may be placed within the overlay image according to the overlay position for the visual effect. In some implementations, the visual effect may be placed within the overlay image according to the overlay orientation for the visual effect.

The display component may be configured to effectuate displaying of an overlay image on the display. The displaying may be effectuated so that the visual effect appears to augment the appearance of the object.

The light effects component may be configured to change the dynamic light pattern of the patterned light source. The light effects component may change the dynamic light pattern of the patterned light source based on communication with another object or based on user input received through an input device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
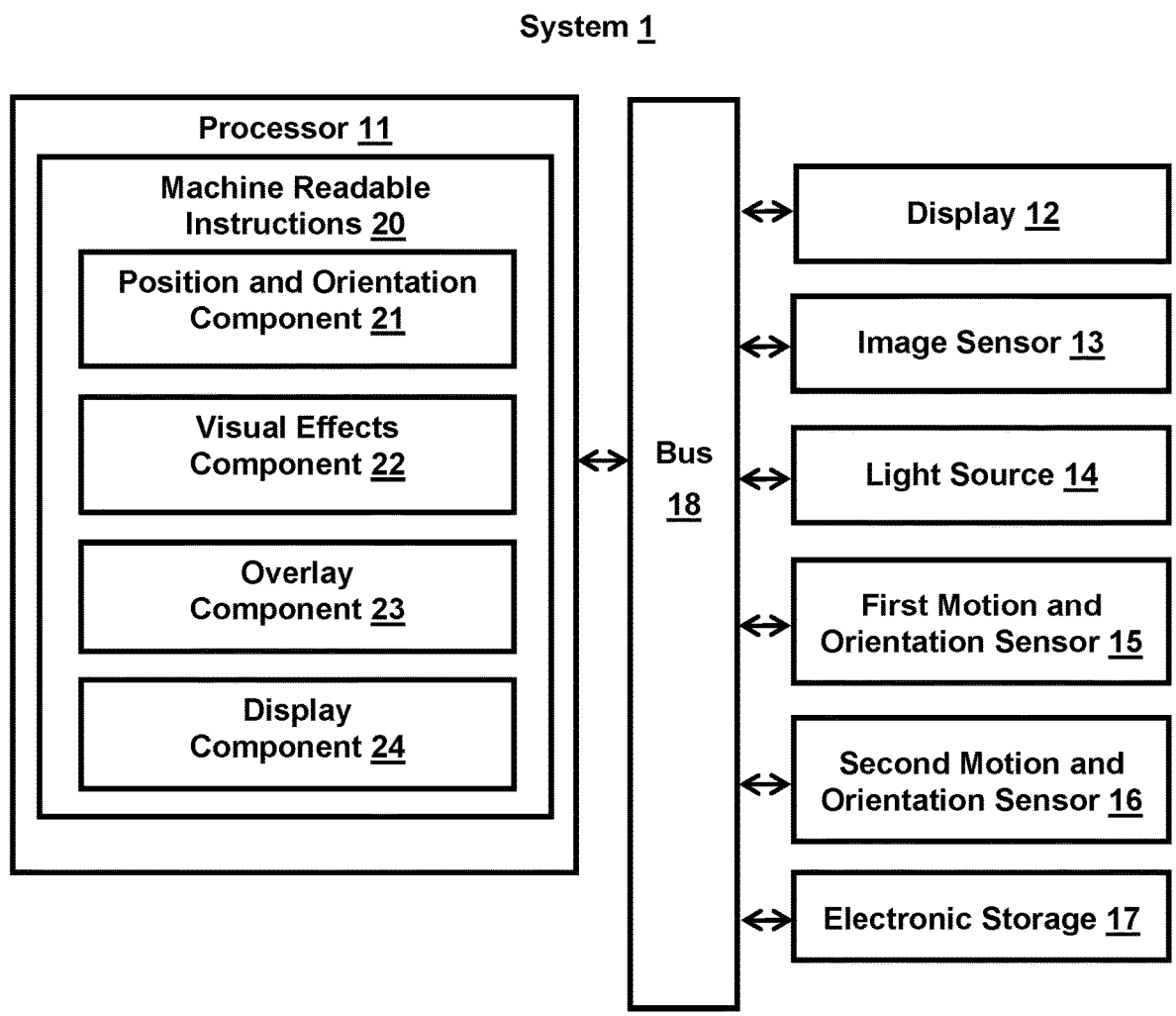
FIG. 1 illustrates a system for augmenting an appearance of an object.

FIG. 1 illustrates a system 1 for augmenting an appearance of an object. System 1 may include one or more of processor 11, display 12, image sensor 13, light source 14, first motion and orientation sensor 15, second motion and orientation sensor 16, electronic storage 17, bus 18, an object, and/or other components. In some implementations, system 1 may include a speaker. In some implementations, system 1 may include a haptic generator. The object may be configured to carry (e.g., attach to, support, hold, and/or otherwise carry) one or more components of system 1. The object may include a handheld device, a wearable device, a remote control vehicle, a semi-autonomous vehicle, or an autonomous vehicle, and/or other objects.

The appearance of the object may be augmented by determining a position and an orientation of the object. Light source 14 may be carried by the object. Light source 14 may indicate a reference point for the object that facilitates determination of the position and an orientation of the object. First motion and orientation sensor 15 may provide motion and orientation information of display 12 and second motion and orientation sensor 16 may provide motion and orientation information of the object, which may be used to determine the position and the orientation of the object. An overlay position and an overlay orientation for a visual effect may be determined based on the position and the orientation of the object. The visual effect may be placed within an overlay image according to the overlay position and the overlay orientation. The overlay image may be displayed on display 12 so that the visual effect appears to augment the object.

Display 12 may be configured to display an overlay image. In some implementations, display 12 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, processor 11 and image sensor 13 may be carried on display 12, and the field of view of image sensor 13 may be a function of the position and the orientation of display 12.

Image sensor 13 may be configured to generate visual output signals conveying visual information within the field of view of image sensor 13. Visual information may include one or more of an image, a video, and/or other visual information. When an object is within the field of view of image sensor 13, visual information may include one or more of an image, a video, and/or other visual information regarding the object. Image sensor 13 may include one or more of a charge-coupled device sensor, an active pixel sensor, a complementary metal-oxide semiconductor sensor, an N-type metal-oxide-semiconductor sensor, and/or other image sensors.

Light source 14 may be carried by the object. Light source 14 may indicate a reference point for the object that facilitates determination of a position and/or an orientation of the object. Light source 14 may include one or more sources of electromagnetic radiation. Light source 14 may be configured to generate light in one or more wavelengths. In some implementations, light source 14 may include a patterned light source as described below. In some implementations, light source 14 may include one or more light emitting diodes.

Figure 4A:
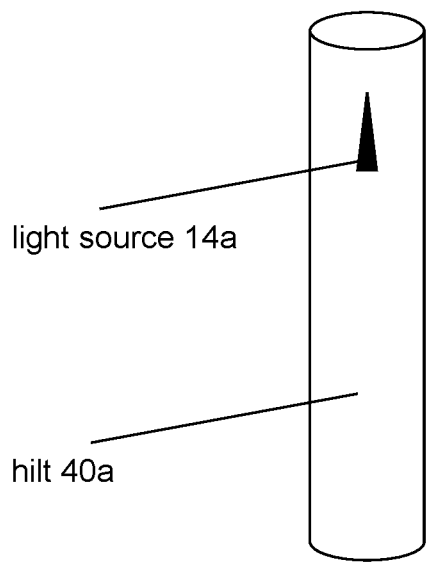
FIGS. 4A-4D illustrates examples of objects with a light source.
Figure 4B:
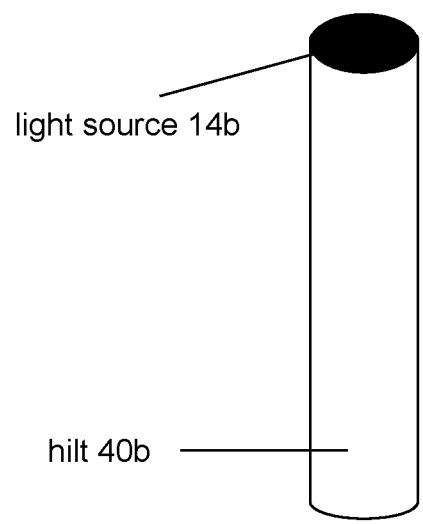
Figure 4C:
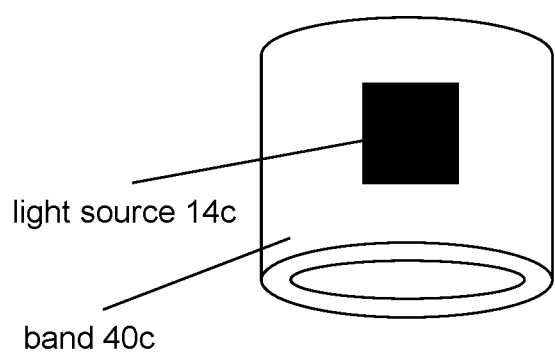
Figure 4D:
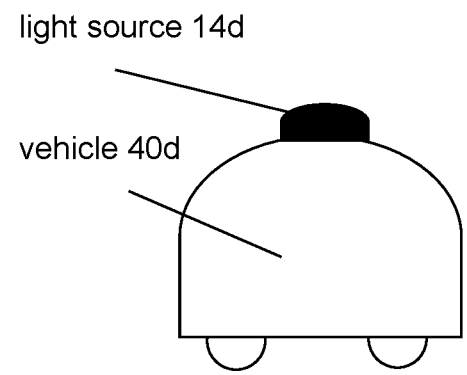

FIGS. 4A-4D provide non-limiting examples of light sources 14 carried by objects. In FIG. 4A, the object may include hilt 40a, and light source 14a is triangular in shape. In FIG. 4B, the object may include hilt 40b, and light source 14b is a rounded diffuser attached to an end of hilt 40b. In FIG. 4C, the object may include band 40c, and light source 14c is rectangular in shape. In FIG. 4D, the object may include vehicle 40d, and light source 14d is a rounded diffuser attached to the top of vehicle 40d. In some implementations, light source 14 may be carried by an object as described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, the foregoing being incorporated herein by reference in its entirety. In some implementations, an object may include multiple types of light source 14. Other types and configurations of light source 14 and objects are contemplated.

First motion and orientation sensor 15 may be carried by display 12. First motion and orientation sensor 15 may be configured to generate first motion and orientation output signals conveying motion and/or orientation information of display 12. Motion and/or orientation information of display 12 may characterize one or more motion and/or orientation of display 12. Motion of display 12 may include one or more of movement of display 12, change in position of display 12, and/or other motion of display 12 at a time or over a period of time. In some implementations, motion of display 12 may include distance between display 12 and the object at a time or over a period of time. Orientation of display 12 may include one or more of yaw, pitch, and/or roll of display 12, change in yaw, pitch, and/or roll of display 12, and/or other orientation of display 12 at a time or over a period of time. In some implementations, orientation of display 12 may include orientation of display 12 with respect to the object at a time or over a period of time.

In some implementations, first motion and orientation sensor 15 may include one or more of an inertial measurement unit, a magnetic position sensor, a radio-frequency position sensor, and/or other motion and orientation sensors. An inertial measurement unit may include one or more of accelerometers, gyroscopes, magnetometers, and/or other motion and orientation sensors. An inertial measurement unit may include one or more of 3-DOF inertial measurement units, 6-DOF inertial measurement units, 9-DOF inertial measurement units, and/or other inertial measurement units. In some implementations, first motion and orientation sensor 15 may include one or more distance sensors, such as infrared distance sensors, Lidar, ultrasonic distance sensors, and/or other distance sensors.

Second motion and orientation sensor 16 may be carried by the object. Second motion and orientation sensor 16 may be configured to generate second motion and orientation output signals conveying motion and/or orientation information of the object. Motion and/or orientation information of the object may characterize one or more motion and/or orientation of the object. Motion of the object may include one or more of movement of the object, change in position of the object, and/or other motion of the object at a time or over a period of time. In some implementations, motion of the object may include distance between display 12 and the object at a time or over a period of time. Orientation of the object may include one or more of yaw, pitch, and/or roll of the object, change in yaw, pitch, and/or roll of the object, and/or other orientation of the object at a time or over a period of time. In some implementations, orientation of the object may include orientation of the object with respect to display 12 at a time or over a period of time.

In some implementations, second motion and orientation sensor 16 may include one or more of an inertial measurement unit, a magnetic position sensor, a radio-frequency position sensor, and/or other motion and orientation sensors. An inertial measurement unit may include one or more of accelerometers, gyroscopes, magnetometers, and/or other motion and orientation sensors. An inertial measurement unit may include one or more of 3-DOF inertial measurement units, 6-DOF inertial measurement units, 9-DOF inertial measurement units, and/or other inertial measurement units. In some implementations, second motion and orientation sensor 16 may include one or ore distance sensors, such as infrared distance sensors, Lidar, ultrasonic distance sensors, and/or other distance sensors.

In some implementations, system 1 may include a third motion and orientation sensor. The third motion and orientation sensor may be affixable to a body part of a user of the object. Third motion and orientation sensor may be configured to generate third motion and orientation output signals conveying motion and/or orientation information of the body part of the user. Motion and/or orientation information of the body part may characterize one or more motion and/or orientation of the body part. Motion of the body part may include one or more of movement of the body part, change in position of the body part, and/or other motion of the body part at a time or over a period of time. In some implementations, motion of the body part may include distance between display 12 and/or object and the body part at a time or over a period of time. Orientation of the body part may include one or more of yaw, pitch, and/or roll of the body part, change in yaw, pitch, and/or roll of the body part, and/or other orientation of the body part at a time or over a period of time. In some implementations, orientation of the body part may include orientation of display 12 and/or object with respect to the body part at a time or over a period of time.

In some implementations, the third motion and orientation sensor may include one or more of an inertial measurement unit, a magnetic position sensor, a radio-frequency position sensor, and/or other motion and orientation sensors. An inertial measurement unit may include one or more of accelerometers, gyroscopes, magnetometers, and/or other motion and orientation sensors. An inertial measurement unit may include one or more of 3-DOF inertial measurement units, 6-DOF inertial measurement units, 9-DOF inertial measurement units, and/or other inertial measurement units. In some implementations, the third motion and orientation sensor may include one or more distance sensors, such as infrared distance sensors, Lidar, ultrasonic distance sensors, and/or other distance sensors.

Electronic storage 17 may include electronic storage media that electronically stores information. Electronic storage 17 may store software algorithms, information determined by processor 11, information received remotely, and/or other information that enables system 1 to function properly. For example, electronic storage 17 may store visual information (as discussed elsewhere herein), information relating to visual effects, and/or other information.

Processor 11 may be configured to provide information processing capabilities in system 1. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 20 to facilitate augmenting an appearance of an object. Machine readable instructions 20 may include one or more of position and orientation component 21, visual effects component 22, overlay component 23, display component 24, and/or other components.

Position and orientation component 21 may be configured to determine a position and/or an orientation of an object based on one or more of the visual output signals, the first motion and orientation output signals, and/or the second motion and orientation output signals. In some implementations, position and orientation component 21 may determine a position and/or an orientation of an object based on one or more of the visual output signals, the first motion and orientation output signals, and/or the second motion and orientation output signals as described in described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

Position and orientation component 21 may determine a position and/or an orientation of light source 14 based on the visual output signals. Position and orientation component 21 may determine a position and/or an orientation of an object based the position and/or the orientation of light source 14. Light source 14 may indicate a reference point for the object that facilitates determination of the position and/or the orientation (yaw, pitch, and/or roll) of the object. Position and orientation component 21 may include or retrieve information (for example, a database, etc.) that matches a detected light source 14 to a position and/or an orientation of an object relative to the position and/or the orientation of the detected light source 14. For example, position and orientation component 21 may determine the position of an object based on the position of light source 14, and/or the orientation of the object based on the orientation of the light source 14.

For example, position and orientation component 21 may detect light source 14a (shown in FIG. 4A) and determine a position and/or an orientation of light source 14a. Position and orientation component 21 may determine a position and/or an orientation of hilt 40a based on the position and/or the orientation of light source 14a. Light source 14a may indicate the position and/or orientation of hilt 40a, For example, the position of hilt 40a may be indicated by certain distances from light source 14a (e.g., the right, left, top, and/or bottom positions of hilt 40a are determined by certain distances to the right, left, above, and/or below light source 14a). The orientation of hilt 40a may be indicated by the orientation of light source 14a (e.g., the pointed end of light source 14a points toward the top of hilt 40a).

Position and orientation component 21 may determine a position and/or an orientation of an object based on the visual output signals and based on the first motion and orientation output signals and the second motion and orientation output signals. For example, position and orientation component 21 may determine a position and/or an orientation of the object based on the position and/or the orientation of light source 14, and to adjust the position and/or the orientation of the light source based on the first motion and orientation output signals and the second motion and orientation output signals. Such a determination of the position and/or the orientation of an object may increase the accuracy of determining the position and/or the orientation of the object.

As another example, position and orientation component 21 may have determined an initial position and/or an initial orientation of an object and then may determine a new position and/or a new orientation of the object based on the first motion and orientation output signals and the second motion and orientation output signals. Such a determination of the new position and/or the new orientation of an object may allow position and orientation component 21 to avoid any latency arising from determining a position and/or an orientation of an object based on the visual output signals. Such a determination of the new position and/or the new orientation of an object may allow position and orientation component to determine a position and/or an orientation of an object when the object moves out of the field of view of image sensor 13.

In some implementations, position and orientation component 21 may be configured to determine a position and/or an orientation of an object further based on the third motion and orientation output signals. For example, an object may be held by a right hand of a user and a third motion and orientation sensor may be affixed to a body part of the user, such as the user's right arm, right elbow, right shoulder, neck, head, or other body part of the user. The third motion and orientation output signals may provide additional information regarding any changes in the movement and/or orientation of the object by providing information regarding changes in the movement and/or orientation of the user's body part. Additional motion and orientation sensors may be affixed to multiple body parts of the user to provide additional information regarding any changes in the movement and/or orientation of the body parts and the object.

In some implementations, position and orientation component 21 may be configured to adjust a position and/or an orientation of an object to compensate for any offsets in tracking of the position and/or the orientation of the object. Position and orientation component 21 may use a dynamic or static calibration routine to compensate for any offsets in tracking. For example, position and orientation component 21 may use a calibration routine that detects one or more known markers on the object based on the visual output signals. Based on the determined position and/or the orientation of the object and the known marker(s), position and orientation component 21 may determine how the known marker(s) should appears within the field of view of image sensor 13. If there is a difference between the detected maker(s) and how the known marker(s) should appear (indicating an offset in tracking of the position and/or the orientation object), position and orientation component 21 may adjust the tracking of the position and/or the orientation of the object to compensate for the difference. In some implementations, position and orientation component 21 may change one or more aspects of a calibration based on a user input.

Visual effects component 22 may be configured to select a visual effect. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects.

In some implementations, visual effects component 22 may be configured to select a visual effect based on light source 14. Visual effects component 22 may include or retrieve information (for example, a database, etc.) that matches light source 14 to a particular visual effect. In some implementations, visual effects component 22 may be configured to select the visual effect based on a user input received through an input device. An input device may refer to a device that allows a user to input information. For example, an input device may include a key entry device, a touch entry device, an imaging device, a sound device, and/or other input devices. A user input may refer to one or more information provided by a user through an input device.

A key entry device may include a device that allows a user to provide one or more user inputs by typing one or more of characters, numbers, and/or other symbols. A key entry device may include a separate device or a part of another device. For example, a key entry device may include a keyboard/button coupled to processor 11. As another example, a key entry device may include a mobile device coupled to processor 11. A user may provide one or more user inputs by typing one or more information. For example, a user may provide one or more user inputs by typing one or more of a type, shape, size, color, and/or other information about the visual effect.

A touch entry device may include a device that allows a user to provide user inputs by touching a user interface of the touch entry device. A touch entry device may include a separate device or a part of another device. For example, a touch entry device may include a touch screen coupled to processor 11. As another example, a touch entry device may include a mobile device coupled to processor 11. A user may provide one or more user inputs by touching one or more portions of the touch entry device corresponding to one or more information. For example, a user may provide one or more user inputs by touching one or more portions of the touch entry device corresponding to one or more of a type, shape, size, color, and/or other information about the visual effect.

An imaging device may include a device that allows a user to provide user inputs by using an image sensor of the imaging device. An imaging device may include a separate device or a part of another device. For example, an imaging device may include an image sensor coupled to processor 11. As a non-limiting example, an imaging device may include image sensor 13. As another example, an imaging device may include a mobile device coupled to processor 11. A user may provide one or more user inputs by directing the field of view of the imaging device to objects that include information. For example, a user may provide one or more user inputs by directing the field of view of the imaging device to a landmark, an augmented reality marker, and/or other objects that include one or more of a type, shape, size, color, and/or other information about the visual effect.

A sound device may include a device that allows a user to provide user inputs through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user inputs by speaking one or more of a type, shape, size, color, and/or other information about the visual effect.

In some implementations, visual effects component 22 may be configured to select the visual effect based on a landmark. Visual effects component 22 may include or retrieve information (for example, a database, etc.) that matches a landmark to a particular visual effect. In some implementations, the visual effect may be selected as described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

Figure 5A:
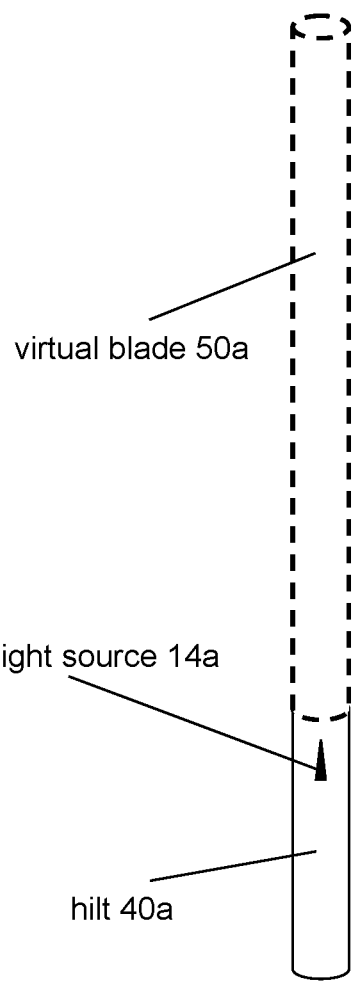
FIGS. 5A-5E illustrate examples of visual effects augmenting appearances of objects.
Figure 5B:
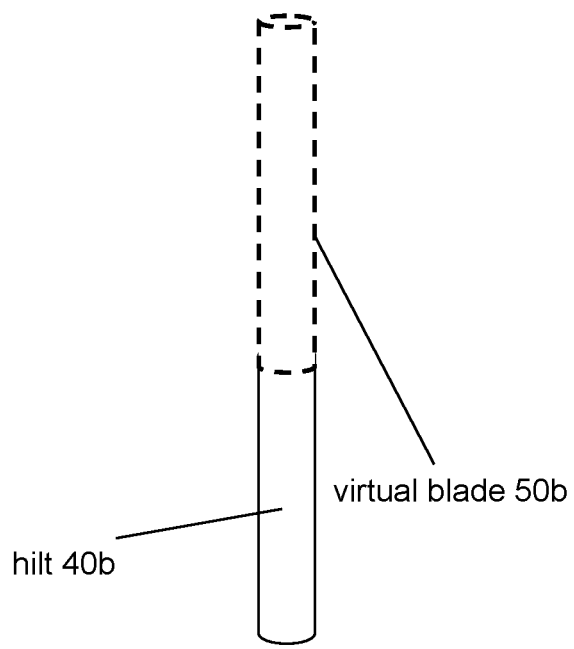
Figure 5C:
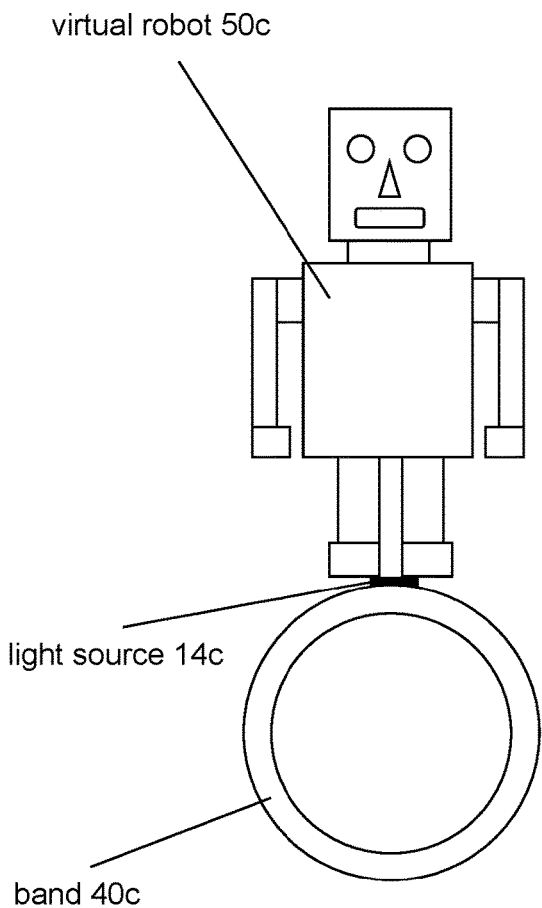
Figure 5D:
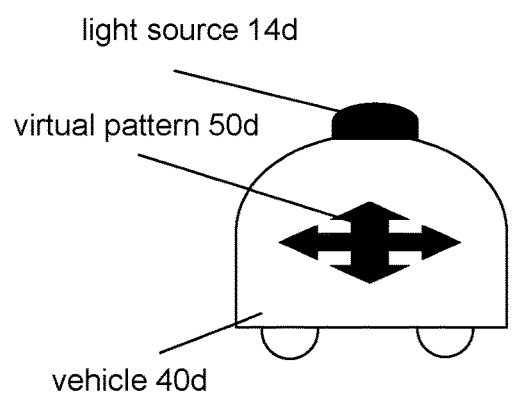
Figure 5E:
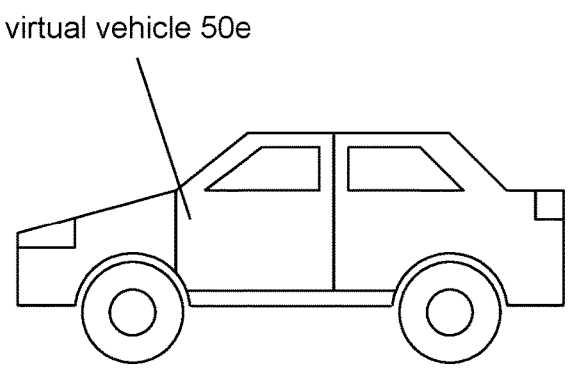

FIGS. 5A-5E illustrate non-limiting examples of visual effects augmenting appearances of objects. In FIG. 5A, visual effects component 22 may select virtual blade 50a based on light source 14a. Virtual blade 50a may be cylindrical in shape and appear to extends outwardly from top of hilt 40a. In FIG. 5B, visual effects component 22 may select virtual blade 50b based on light source 14b. Virtual blade 50b may be shorter than virtual blade 50a. When virtual blade 50b augments the appearance of hilt 40b, light source 14b may not be visible. In FIG. 5C, visual effects component 22 may select virtual robot 50c based on light source 14c. Virtual robot 50c may appear to be standing on top of band 40c. In FIG. 5D, visual effects component 22 may select virtual pattern 50d based on light source 14d. Virtual pattern 50d may appear to be part of a surface design of vehicle 40d. In FIG. 5E, visual effects component 22 may select virtual vehicle 50e based on light source 14d on vehicle 40d. When virtual vehicle 50e augments the appearance of vehicle 40d, vehicle 40d and/or light source 14d may not be visible.

Visual effects component 22 may be configured to determine an overlay position and/or an overlay orientation for the visual effect based on the position and/or the orientation of the object. Visual effects component 22 may include or retrieve information (for example, a database, etc.) that matches an object to an overlay position and/or an overlay orientation for a visual effect. Visual effects component 22 may determine an overlay position and/or an overlay orientation for a visual effect based on a certain distance from an object and/or a certain orientation with respect to an object. For example, visual effects component 22 may determine an overlay position for a visual effect to be a certain distance in front of, behind, above, below, to the right, and/or to the left of the object. Visual effects component 22 may determine an overlay orientation for a visual effect to be at a certain orientation with respect to the object.

In some implementations, visual effects component 22 may be configured to modify the visual effect. For example, visual effects component 22 may modify the visual effect to include additional effects to compensate for any latency and/or offset in tracking the position and/or the orientation of the object. For example, visual effects component 22 may modify the visual effect to include blurring effects and/or lighting effects based on changes in the position and/or the orientation of the object. Such a modification may allow the visual effects component 22 to provide the visual effect that does not appear to lag behind and/or appear to be misplaced with respect to the moving object. In some implementations, visual effects component 22 may change one or more aspects of the visual effect modification based on a user input.

Overlay component 23 may be configured to determine an overlay image. The overlay image may include a visual effect determined by visual effects component 22. The visual effect may be placed within the overlay image according to the overlay position and/or the overlay orientation for the visual effect.

The overlay position and/or the overlay orientation for the visual effect may change how the visual effect appears within the overlay image. For example, the overlay position and/or the overlay orientation for the visual effect may change one or more of the position, the size, the shape, the tilt, the rotation, and/or other appearances of the visual effect.

Display component 24 may be configured to effectuate displaying of an overlay image on display 12. The displaying may be effectuated so that the visual effect appears to augment the appearance of the object. For example, FIGS. 5A-5E illustrate non-limiting examples of visual effects augmenting appearances of objects. In some implementations, display component 24 may be configured to effectuate displaying of an overlay image within one or more of an image, a video, and/or other visual information based on the visual output signals generated by image sensor 13.

In some implementations, display component 24 may be configured to effectuate displaying of an overlay image on display 12, which allows light to be passed through display 12 in portions in which the overlay image does not contain visual effect. For example, display 12 may include one or more of an optical head-mounted display and a user of display 12 may see light from the real world as well as the overlay image. In some implementations, display component 24 may be configured to change the transparency of one or more portions of display 12. For example, display component 24 may change the transparency of one or more portions of display 12 corresponding to the visual effect to block light from the real world passing through display 12.

In some implementations, system 1 may include a speaker. Visual effects component 22 may be configured to effectuate operation of the speaker. The operation of the speaker may be effectuated in response to changes in the overlay position and/or the overlay orientation for the visual effect. The speaker may be operated to provide one or more audio effects. An audio effect may refer to one or more information that may be observed audibly. An audio effect may be static or dynamic, and may be audibly observable at a time, over a period of time, at a location, or over a range of locations. An audio effect may include one or more of a sound, a music, a word, a sentence, and/or other audio effect.

For example, visual effects component 22 may have selected a virtual blade of a lightsaber as the visual effect for an object. When the virtual blade is motionless, visual effects component 22 may effectuate operation of the speaker to produce a buzzing/humming sound of a motionless lightsaber. When the virtual blade is moving, visual effects component 22 may effectuate operation of the speaker to produce a "wah" sound of a moving lightsaber. Visual effects component 22 may be configured to change the intensity and/or length of the sound based on the movement of the virtual blade. In some implementations, visual effects component may effectuate operation of the speaker in response to the virtual blade touching a real object or a virtual object. Other types of audio effects are contemplated.

In some implementations, system 1 may include a haptic generator. In some implementations, the haptic generator may be carried by the object. Visual effects component 22 may be configured to effectuate operation of the haptic generator in response to changes in the overlay position and/or the overlay orientation for the visual effect. The haptic generator may be operated to provide one or more haptic effects. A haptic effect may refer to one or more information that may be observed haptically. A haptic effect may be static or dynamic, and may be haptically observable at a time, over a period of time, at a location, or over a range of locations. A haptic effect may include one or more of a vibration, a motion, a temperature, and/or other haptic effects.

For example, visual effects component 22 may have selected a virtual blade of a lightsaber as the visual effect for an object. Visual effects component 22 may effectuate operation of the haptic generator to produce a light vibration of a lightsaber. Visual effects component 22 may be configured to change the intensity and/or length of the vibration based on the movement of the virtual blade. In some implementations, visual effects component may effectuate operation of the haptic generator in response to the virtual blade touching a real object or a virtual object. Other types of haptic effects are contemplated.

Figure 2:
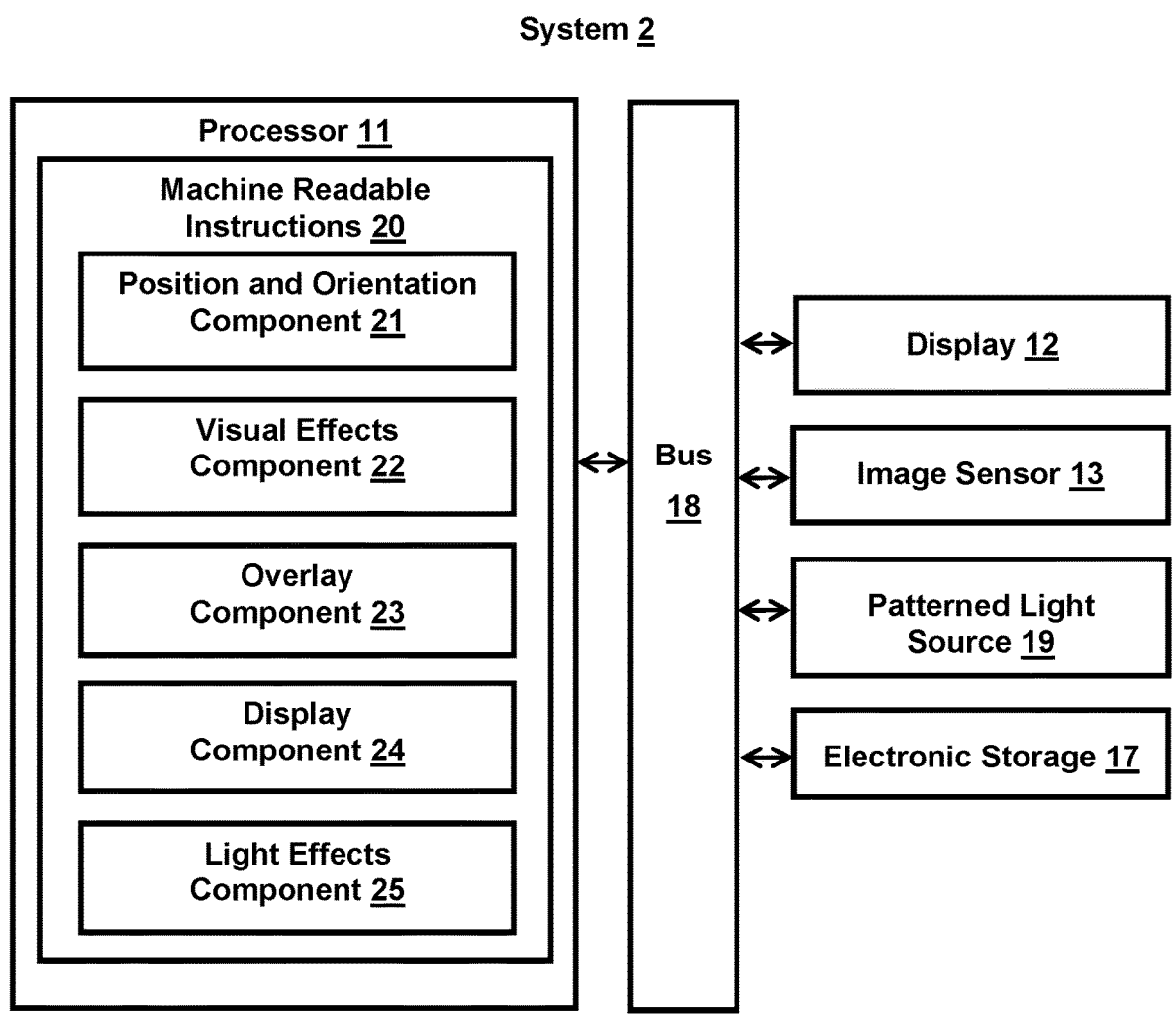
FIG. 2 illustrates a system for augmenting an appearance of an object.

FIG. 2 illustrates a system 2 for augmenting an appearance of an object. System 2 may include one or more of processor 11, display 12, image sensor 13, patterned light source 19, electronic storage 17, bus 18, an object, and/or other components. The object may be configured to carry (e.g., attach to, support, hold, and/or otherwise carry) one or more components of system 2. The object may include a handheld device, a wearable device, a remote control vehicle, a semi-autonomous vehicle, or an autonomous vehicle, and/or other objects. The appearance of the object may be augmented by determining a position of the object. Patterned light source 19 may be carried by the object. Patterned light source 19 may indicate a reference point for the object that facilitates determination of the position of the object. An overlay position for a visual effect may be determined based on the position of the object. The visual effect may be placed within an overlay image according to the overlay position. The overlay image may be displayed on display 12 so that the visual effect appears to augment the object.

Display 12, image sensor 13, and electronic storage 17 in FIG. 2 may operate in system 2 as described above with respect with system 1. Processor 11 in FIG. 2 may be configured to execute one or more machine readable instructions 20 to facilitate augmenting an appearance of an object. Machine readable instructions 20 may include one or more of position and orientation component 21, visual effects component 22, overlay component 23, display component 24, light effects component 25, and/or other components.

Patterned light source 19 may be carried by the object. Patterned light source 19 may indicate a reference point for the object that facilitates determination of a position and/or an orientation of the object. Patterned light source 19 may include one or more sources of electromagnetic radiation. Patterned light source 14 may be configured to generate light in one or more wavelengths. Patterned light source may be configured to generated one or more colors at the same time. In some implementations, patterned light source 19 may include one or more light emitting diodes. In some implementations, patterned light source 19 may be carried by an object as described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra. In some implementations, an object may include multiple types of patterned light source 19. Other types, configurations, and colors of patterned light source 19 are contemplated.

Figure 6A:
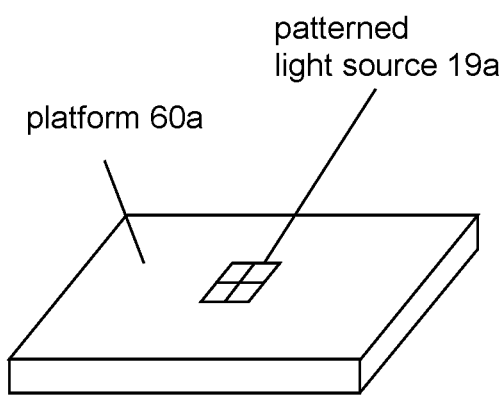
FIGS. 6A-6D illustrate examples of objects with a patterned light source.
Figure 6B:
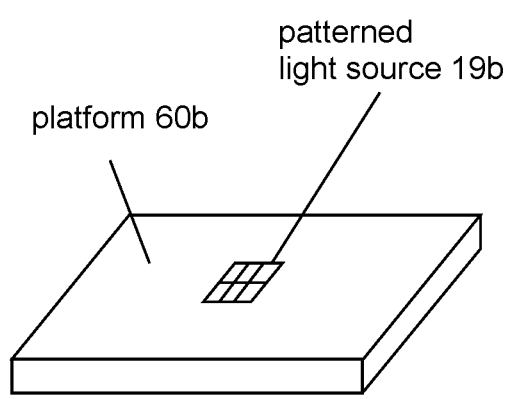
Figure 6C:
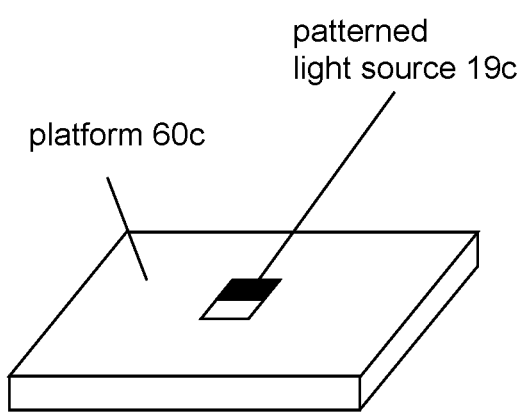
Figure 6D:
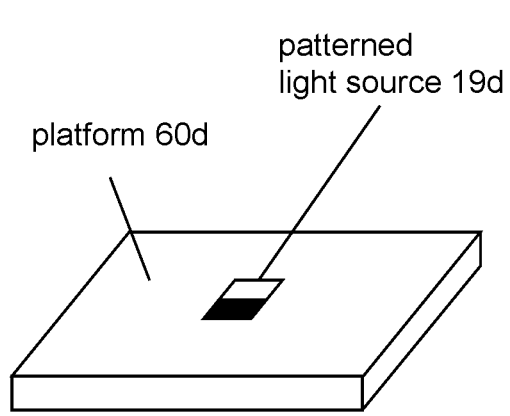

In some implementations, patterned light source 19 may include a static light pattern. A static light pattern may include a light pattern that may not change over time during the operation of patterned light source 19. For example, FIGS. 6A-6D illustrate non-limiting examples of static light pattern in pattern light sources 19 carried by objects. In FIG. 6A, platform 60a carries patterned light source 19a. Patterned light source 19a may include four square shapes generating light that may not change during operation. In FIG. 6B, platform 60b carries patterned light source 19b. Patterned light source 19b may include six rectangular shapes generating light that may not change during operation. In FIG. 6C, platform 60c carries patterned light source 19c, Patterned light source 19c may include two rectangular blocks generating light that may not change during operation. The two rectangular blocks may be of different color. In FIG. 6D, platform 60d carries patterned light source 19d. Patterned light source 19d may include two rectangular blocks generating light that may not change during operation. The two rectangular blocks may be of different color, and may be opposite of colors of patterned light source 19c. A static light pattern may include a single color or multiple colors. A static light pattern may include a single shape or multiple shapes of light pattern. Other types, configurations, and colors of static light pattern are contemplated.

In some implementations, patterned light source 19 may include a dynamic light pattern. A dynamic light pattern may include a light pattern that may change over time during the operation of patterned light source 19. For example, a dynamic light pattern may change from the pattern of patterned light source 19a (shown in FIG. 6A) to the pattern of patterned light source 19b (shown in FIG. 6B), or from the pattern of patterned light source 19c (shown in FIG. 6C) to the pattern of patterned light source 19b (shown in FIG. 6D). As another example, dynamic light pattern may change by turning one or more parts of the patterned light source 19 on and off. The dynamic light pattern may include a sequence of dynamic light pattern, where the sequence of dynamic light pattern includes certain changes in the dynamic light pattern. In some implementations, the sequence of dynamic light pattern may include dynamic light pattern that repeats itself over time (e.g. dynamic light pattern may include two rectangular blocks of different color, and include a sequence of dynamic light pattern where one block stays on while the other block blinks on for 50 milliseconds and off for 150 milliseconds). In some implementations, the sequence of light pattern may not be changed during the operation of dynamic light source 19 (i.e., the sequence of dynamic light pattern is set and does not change during the operation of patterned light source 19). In some implementations, the sequence of light pattern may be changed during the operation of dynamic light source 19 (i.e., the sequence of dynamic light pattern can be changed so that it is not set and may be changed during the operation of patterned light source 19). For example, a dynamic light pattern may include two rectangular blocks of different color, and include a sequence of dynamic light pattern where one block stays on while the other block blinks on for 50 milliseconds and off for 150 milliseconds. The sequence may be changed so that one block blinks on for 50 milliseconds and off for 50 milliseconds while the other block blinks on for 100 milliseconds and off for 100 milliseconds. In some implementations, the dynamic light pattern and/or the sequence of light may be changed by light effects component 25, as described below. A dynamic light pattern may include a single color or multiple colors at a point in time. Other types, configurations, and colors of dynamic light pattern are contemplated.

In some implementations, an orientation sensor may be carried by the object. The orientation sensor may be configured to generate orientation output signals conveying orientation information of the object. Orientation information of the object may characterize one or more orientation of the object. Orientation of the object may include one or more of yaw, pitch, and/or roll of the object, change in yaw, pitch, and/or roll of the object, and/or other orientation of the object at a time or over a period of time. In some implementations, orientation of the object may include orientation of the object with respect to display 12 at a time or over a period of time.

In some implementations, an orientation sensor may be carried by display 12. The orientation sensor may be configured to generate orientation output signals conveying orientation information of display 12. Orientation information of display 12 may characterize one or more orientation of display 12. Orientation of display 12 may include one or more of yaw, pitch, and/or roll of display 12, change in yaw, pitch, and/or roll of display 12, and/or other orientation of display 12 at a time or over a period of time. In some implementations, orientation of display 12 may include orientation of display 12 with respect to the object at a time or over a period of time.

In some implementations, the orientation sensor may include one or more of an accelerometer, a gyroscope, a magnetometer, an inertial measurement unit, a magnetic sensor, a radio-frequency sensor, and/or other orientation sensors. An inertial measurement unit may include one or more of accelerometers, gyroscopes, magnetometers, and/or other orientation sensors. An inertial measurement unit may include one or more of 3-DOF inertial measurement units, 6-DOF inertial measurement units, 9-DOF inertial measurement units, and/or other inertial measurement units. In some implementations, the orientation sensor may include one or more distance sensors, such as infrared distance sensors, Lidar, ultrasonic distance sensors, and/or other distance sensors.

Position and orientation component 21 may be configured to determine a position of an object based on the visual output signals. In some implementations, position and orientation component 21 may determine a position of an object based on the visual output signals as described in described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra Position and orientation component 21 may determine a position an object based the position of patterned light source 19. Patterned light source 19 may indicate a reference point for the object that facilitates determination of the position of the object. Position and orientation component 21 may include or retrieve information (for example, a database, etc.) that matches a detected patterned light source 19 to a position of an object relative to the position of the detected patterned light source 19. For example, position and orientation component 21 may determine the position of an object based on the position of patterned light source 19.

Visual effects component 22 may be configured to select a visual effect. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects.

In some implementations, visual effects component 22 may be configured to select a visual effect based on patterned light source 19. Visual effects component 22 may include or retrieve information (for example, a database, etc.) that matches patterned light source 19 to a particular visual effect. In some implementations, visual effects component 22 may be configured to select the visual effect based on a user input received through an input device, as described above. In some implementations, visual effects component 22 may be configured to select the visual effect based on a landmark, as described above.

Visual effects component 22 may be configured to determine an overlay position for the visual effect based on the position of the object. Visual effects component 22 may include or retrieve information (for example, a database, etc.) that matches an object to an overlay position for a visual effect. Visual effects component 22 may determine an overlay position for a visual effect based on a certain distance from an object. For example, visual effects component 22 may determine an overlay position for a visual effect to be a certain distance in front of, behind, above, below, to the right, and/or to the left of the object.

Overlay component 23 may be configured to determine an overlay image. The overlay image may include a visual effect determined by visual effects component 22. The visual effect may be placed within the overlay image according to the overlay position for the visual effect.

Display component 24 may be configured to effectuate displaying of an overlay image on display 12. The displaying may be effectuated so that the visual effect appears to augment the appearance of the object.

Figure 7A:
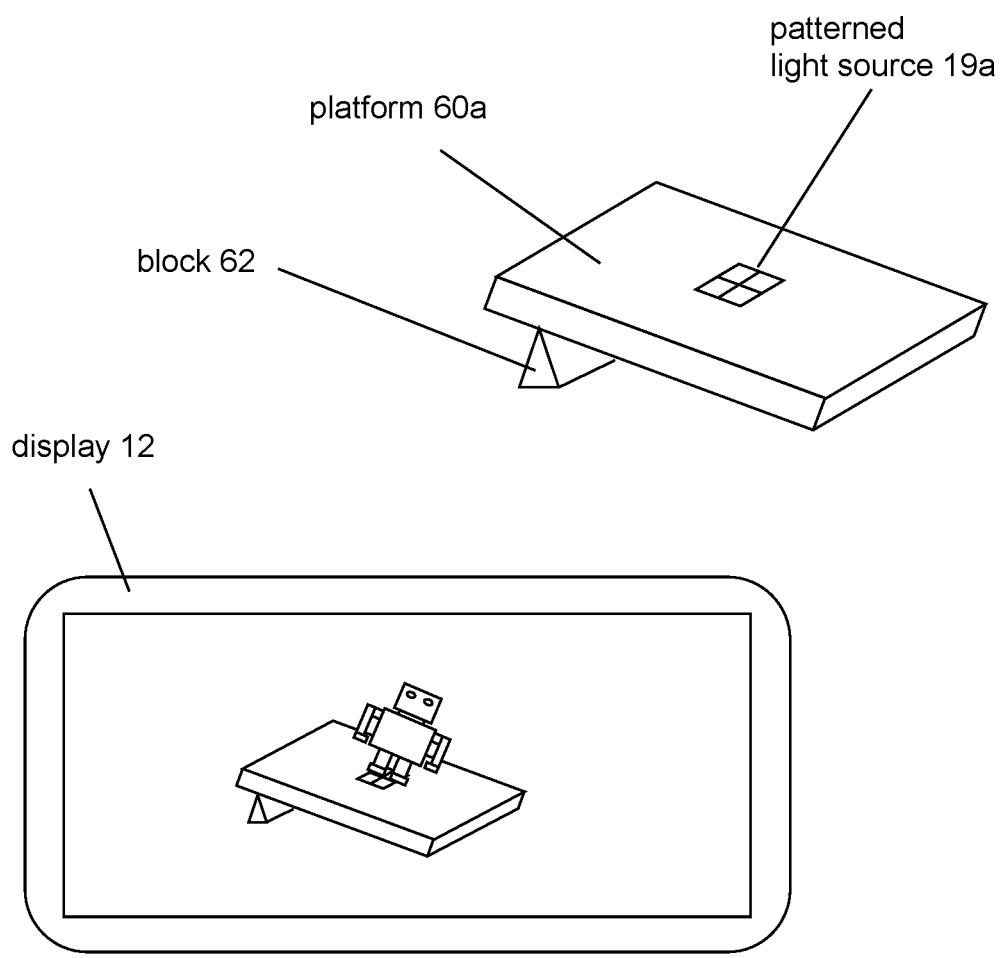
FIGS. 7A-7B illustrate examples of a display augmenting an appearance of a platform with a visual effect.

In some implementations, an orientation sensor may be carried by the object, and position and orientation component 21 may be configured to determine an orientation of an object based on the orientation output signals. Position and orientation component 21 may determine an orientation of an object based the orientation output signals conveying orientation information of the object. For example, FIG. 7A illustrates an example of display 12 displaying a visual effect (virtual robot) augmenting an appearance of platform 60*a*. Platform 60*a* is tilted up at the left side by block 62. Position and orientation sensor 21 may determine the orientation of platform 60*a* based the orientation output signals conveying the orientation information of platform 60*a* that platform 60*a* is tilted up at the left side by a certain angle. Visual effects component 22 may determine an overlay orientation for the visual effect based on the orientation of platform 60*a*. Overlay component 23 may place the visual effect according to the overlay position and the overlay orientation for the visual effect (e.g., in FIG. 7A, virtual robot shown in display 12 is tilted to match the orientation of platform 60*a*).

Figure 7B:
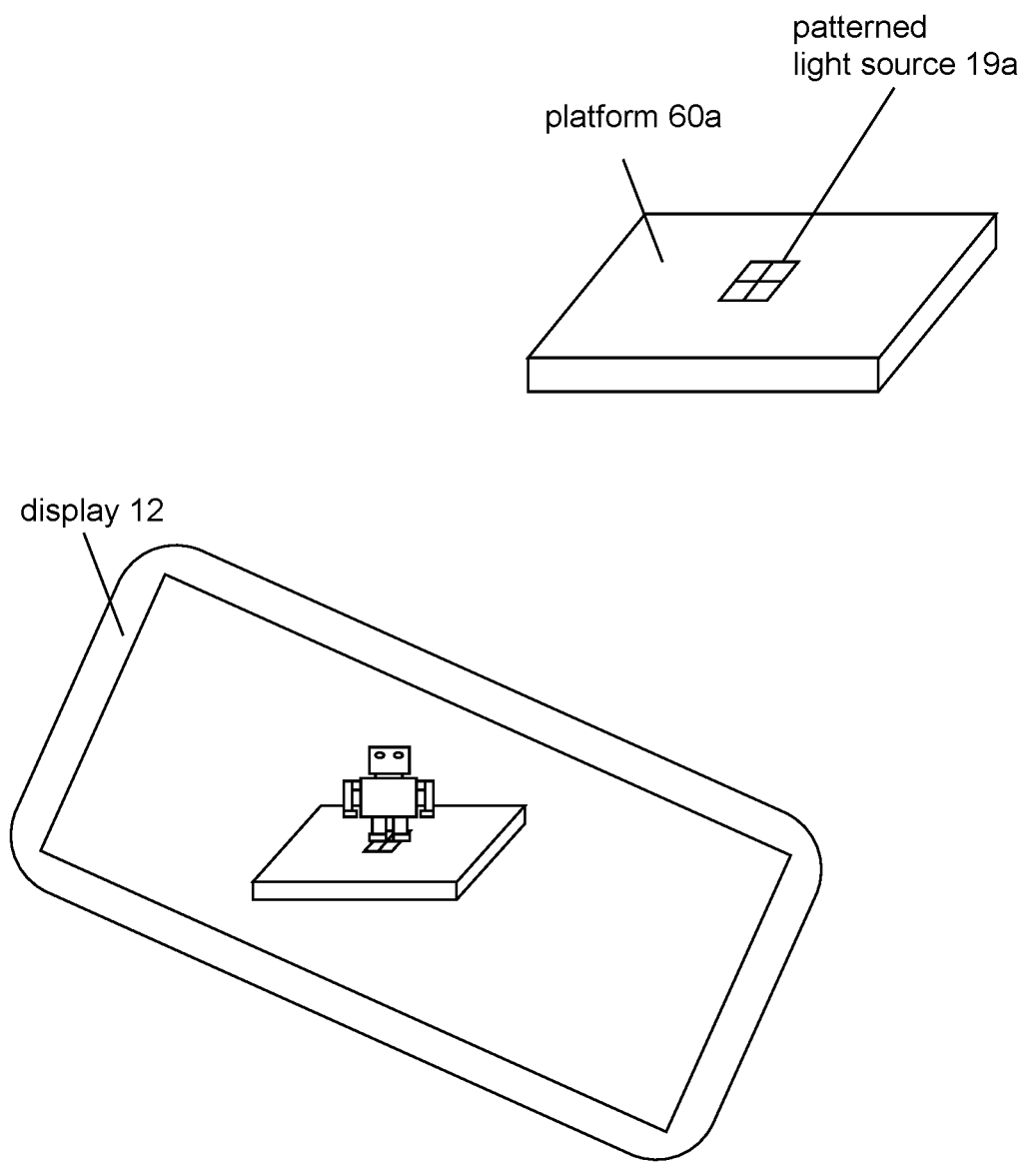

In some implementations, an orientation sensor may be carried by display 12, and position and orientation component 21 may be configured to determine an orientation of display based on the orientation output signals. Position and orientation component 21 may determine an orientation of display 12 based the orientation output signals conveying orientation information of display 12. For example, FIG. 7B illustrates an example of display 12 displaying a visual effect (virtual robot) augmenting an appearance of platform 60*a*. Display 12 is tilted up at the left side. Position and orientation sensor 21 may determine the orientation of display 12 based the orientation output signals conveying the orientation information of display 12 that display 12 is tilted up at the left side by a certain angle. Visual effects component 22 may determine an overlay orientation for the visual effect based on the orientation of display 12. Overlay component 23 may place the visual effect according to the overlay position and the overlay orientation for the visual effect (e.g., in FIG. 7B, virtual robot shown in display 12 is tilted to account for the orientation of display 12).

In some implementations, light effects component 25 may be configured to change the dynamic light pattern of patterned light source 19. For example, light effects component 25 may change the dynamic light pattern of patterned light source 19 based on communication with another object or based on user input received through an input device, as described above. For example, light effects component 25 may change the color and/or pattern of the dynamic light pattern (e.g., in response to the dynamic light pattern being surrounded by light of similar color/pattern) so that it may be more easily detected. As another example, light effects component 25 may change the sequence of the dynamic light pattern (e.g., change a dynamic light pattern from alternatively showing red and blue lights to alternatively showing yellow and green lights, etc.). Other changes in dynamic light pattern and sequence of dynamic light pattern are contemplated.

Figure 3:
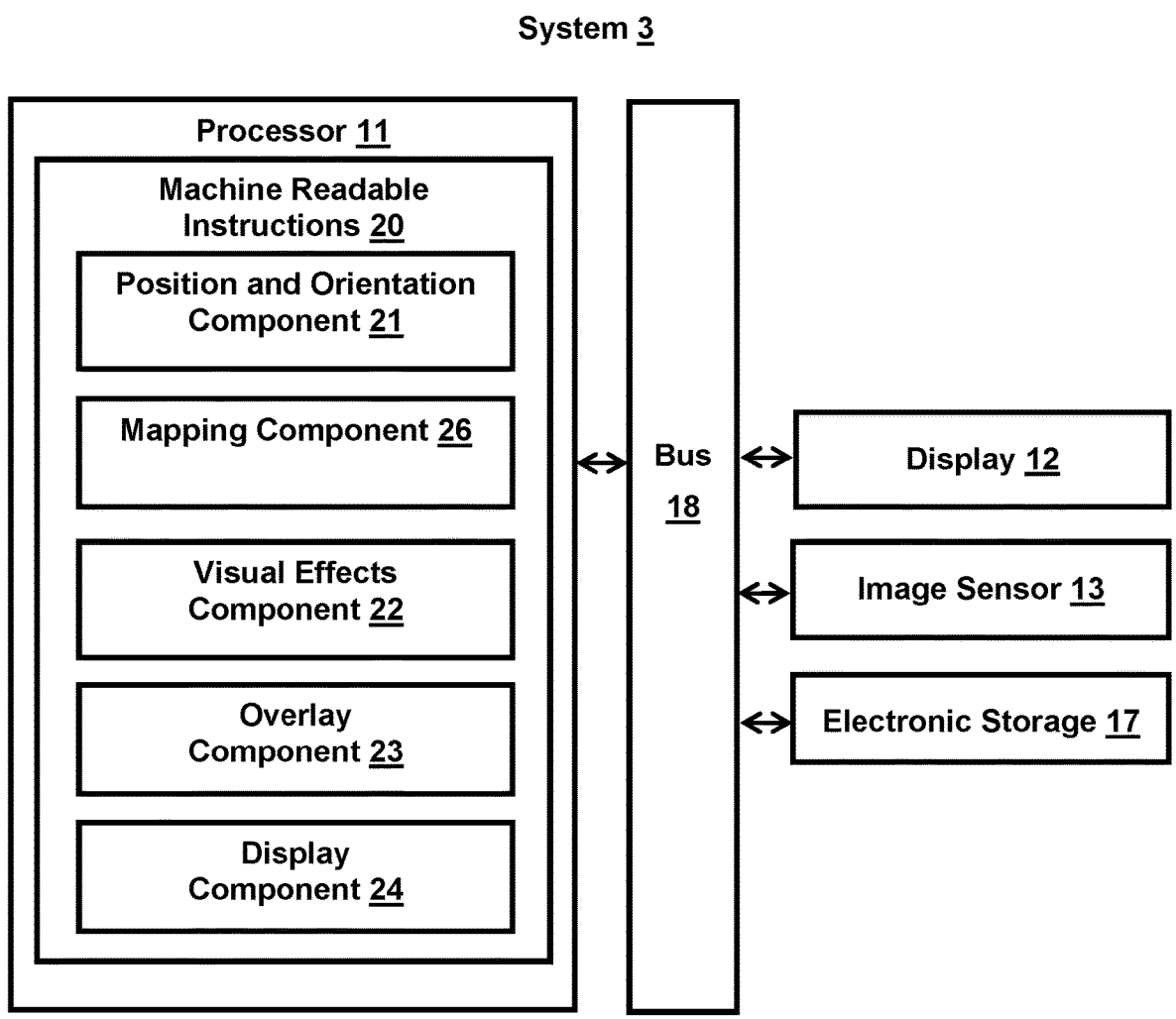
FIG. 3 illustrates a system for augmenting an appearance of an environment.

FIG. 3 illustrates a system 3 for augmenting an appearance of an environment. System 3 may include one or more of processor 11, display 12, image sensor 13, electronic storage 17, bus 18, visual markers, and/or other components. The appearance of the environment may be augmented by determining positions and orientation of the visual markers. The positions and orientations of the visual markers may be used to classify a region of the environment as being partially-mapped or fully-mapped. Responsive to the region being classified as partially-mapped, a partially-mapped visual effect may be selected for an overlay image. An overlay position and overlay orientation for the partially-mapped visual effect may be determined based on the positions and orientations of the visual markers. The partially-mapped visual effect may be placed within the overlay image according to the overlay position and orientation. The overlay image may be displayed on display 12 so that the partially-mapped visual effect appears to augment the partially-mapped region of the environment.

Display 12, image sensor 13, and electronic storage 17 in FIG. 3 may operate in system 3 as described above with respect with system 1. Processor 11 in FIG. 3 may be configured to execute one or more machine readable instructions 20 to facilitate augmenting an appearance of an object. Machine readable instructions 20 may include one or more of position and orientation component 21, visual effects component 22, overlay component 23, display component 24, mapping component 26, and/or other components Position and orientation component 21 may be configured to detect visual markers based on the visual output signals. An environment may include one or more visual markers. A visual marker may include things that facilitate determination of a position and/or an orientation of a corresponding object. For example, visual markers may include one or more of a label on or near the object, a sticker on or near the object, an augmented reality marker on or near the object, a landmark on or near the object, a light source on or near the object, a part of an object, an entire shape of an object, and/or other visual markers. In some implementations, a visual marker may include one or more light sources, such as light emitting diodes. Detection of a visual marker may include identification of the visual marker and/or the corresponding object. In some implementations, identification of the visual marker may include position and orientation component 21 effectuating communication with the visual marker and/or the corresponding object to facilitate the identification of the visual marker and/or the corresponding object. Communication may include wireless communication. By way of non-limiting example, wireless communication may include one or more of radio communication, Bluetooth communication, Wi-Fi communication, cellular communication, infrared communication, or other wireless communication.

Position and orientation component 21 may be configured to determine positions and orientations of visual markers based on the visual output signals. In some implementations, position and orientation component 21 may determine positions and orientations of a visual marker based on the visual output signals as described in described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

Figure 8:
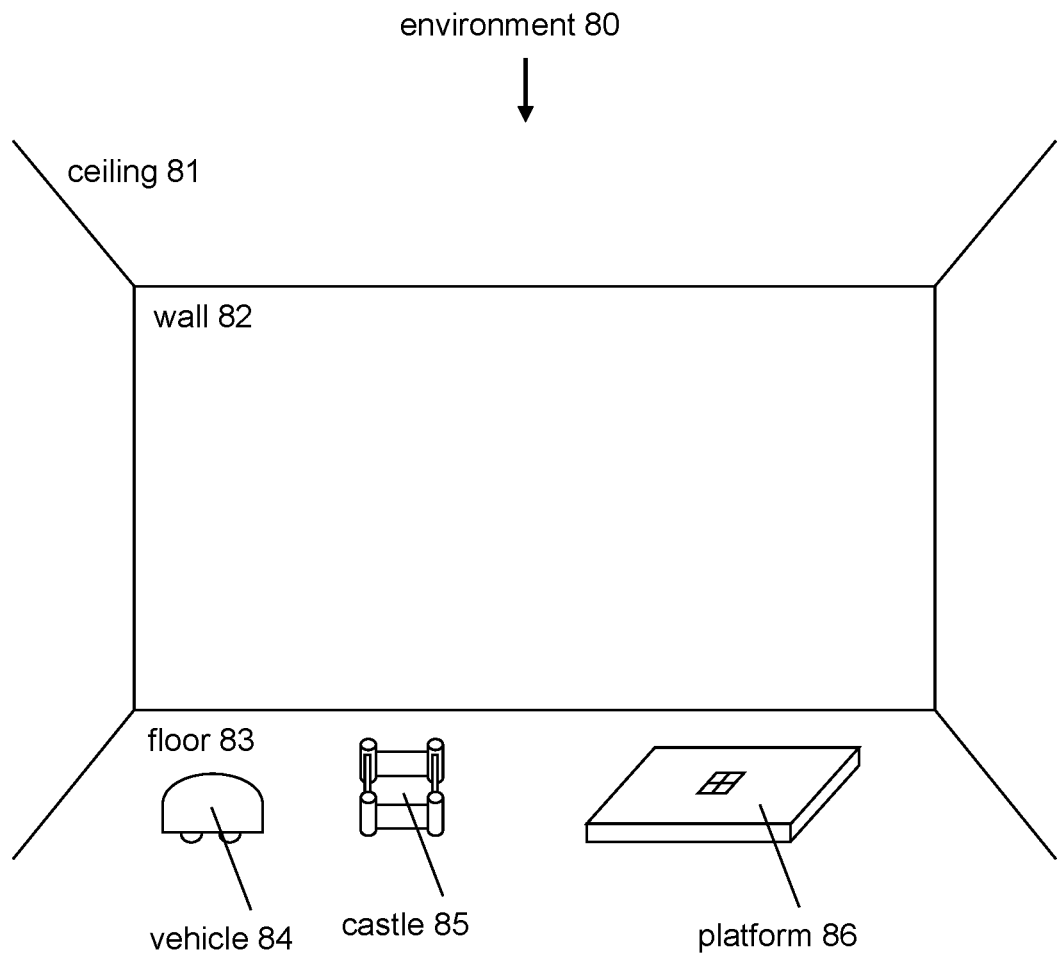
FIG. 8 illustrates an example of an environment within a field of view of an image sensor.

For example, FIG. 8 illustrates an example of an environment within a field of view of image sensor 13. In FIG. 8, environment 80 may include cell 81, wall 82, floor 83, and other objects. Floor 83 may include vehicle 84, castle 85, platform 86, and/or other objects. One or more of ceiling 81, wall 82, floor 83, vehicle 84, castle 85, and/or platform 86 may include one or more visual markers (such as one or more light sources). One or more of ceiling 81, wall 82, floor 83, vehicle 84, castle 85, and/or platform 86 may be visual markers. One or more parts of ceiling 81, wall 82, floor 83, vehicle 84, castle 85, and/or platform 86 may be visual markers. Position and orientation component 21 may detect one or more visual markers near or on ceiling 81, wall 82, floor 83, vehicle 84, castle 85, and/or platform 86. Position and orientation component 21 may detect one or more of ceiling 81, wall 82, floor 83, vehicle 84, castle 85, and/or platform 86 as visual markers. Position and orientation component 21 may determine positions and orientations of one or more visual markers near or on ceiling 81, wall 82, floor 83, vehicle 84, castle 85, and/or platform 86. Position and orientation component 21 may determine positions and orientations of one or more of ceiling 81, wall 82, floor 83, vehicle 84, castle 85, and/or platform 86. Other objects in environment 82 may not be detected and their positions and orientations may not be determined.

Mapping component 26 may be configured to, based on the positions and orientations of the visual markers, classify a region of the environment as being partially-mapped or fully-mapped. Partially-mapped may indicate that the visual markers provide insufficient environment information to accurately place a fully-mapped visual effect with respect to a shape of the environment in the region. Fully-mapped may indicate that the visual markers provide sufficient environment information to accurately place a fully-mapped visual effect with respect to the shape of the environment in the region.

A fully-mapped visual effect may refer to a visual effect that may fit within a region of an environment based on a precise shape of the environment in the region. A precise shape of a region may be determined by specific shapes/identities and positions of objects in the region. A visual effect may fit within a region of an environment based on the precise shape of the environment in the region based on one or more of type, shape, size, and/or color of the visual effect. A partially-mapped visual effect may refer to a visual effect that may fit within the a region of an environment based on a general shape of the environment in the region. A general shape of a region may be determined by the size, position and orientation of the region. A visual effect may fit within a region of an environment based on a general shaped of the environment in the region based on one or more of type, shape, size, and/or color of the visual effect.

In some implementations, a partially-mapped visual effect may include a static visual effect. A static visual effect may include a static virtual distant object (e.g., static objects that appear to be far from the position of display 12, image sensor 13, and/or one or more objects), a static virtual environmental effect (e.g., simulation of one or more static environmental conditions, such as lighting conditions, etc.), and/or other static visual effects. For example, a static virtual distant object may include a virtual planet, a virtual star, a virtual landscape, a virtual machine, a virtual building and/or other virtual distant objects that appear to be far away and not moving or changing.

In some implementations, a partially-mapped visual effect may include a dynamic visual effect. A dynamic visual effect may include a dynamic virtual distant object (e.g., dynamic objects that appear to be far from the position of display 12, image sensor 13, and/or one or more objects), a dynamic virtual environmental effect (e.g., simulation of one or more dynamic environmental conditions, such as weather conditions, lighting conditions, etc.), and/or other dynamic visual effects. For example, a dynamic virtual environmental effect may include a virtual cloud, a virtual rain, a virtual dust storm, a virtual snow storm, a virtual wind, a virtual heat shimmer, a virtual smoke, a virtual fog, and/or other visual environmental effect that move or changes.

Figure 9:
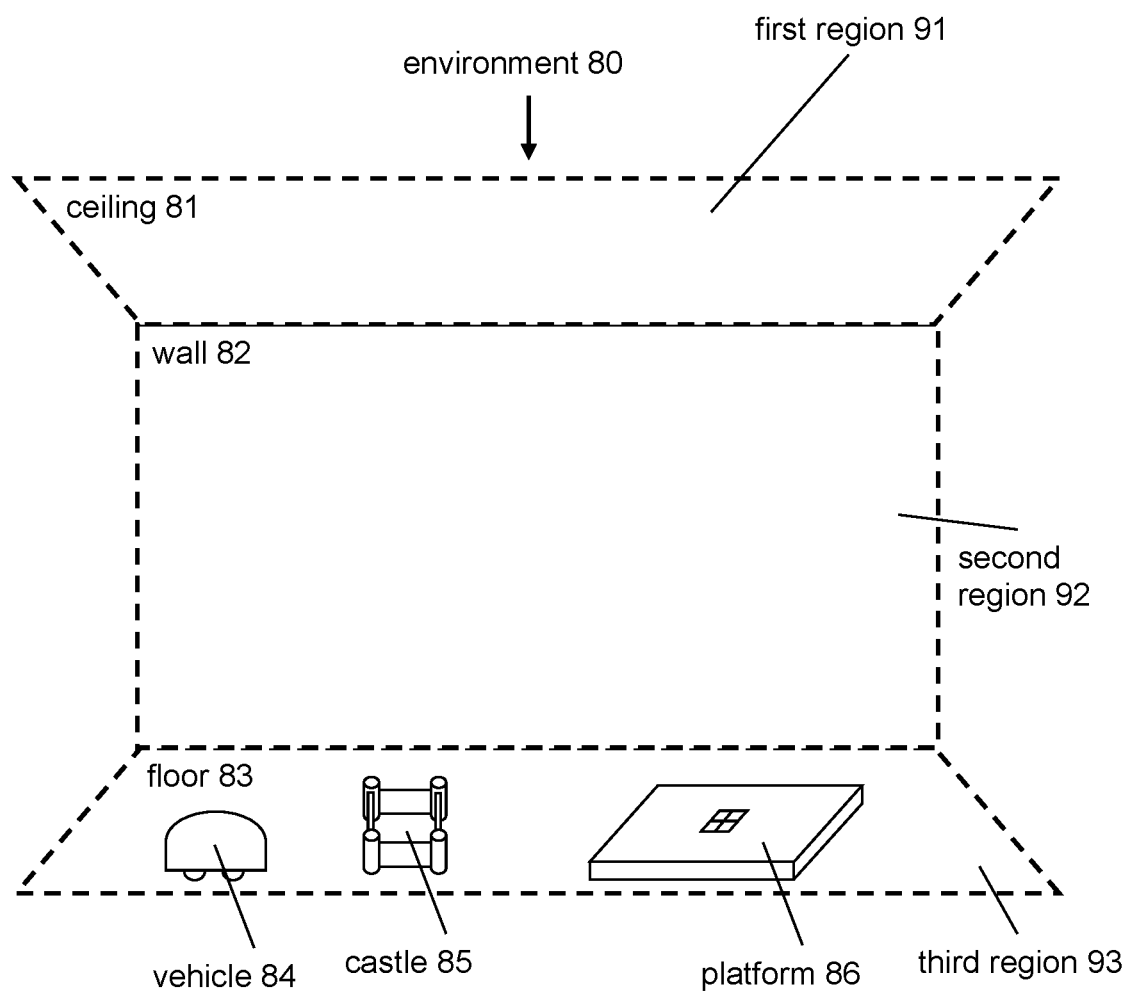
FIG. 9 illustrates an example of regions of an environment within a field of view of an image sensor.

For example, in FIG. 9, mapping component 26 may classify first region 91, which includes ceiling 81, as being partially-mapped. One or more visual markers in first region 91 may indicate the general shape (including the size, position and orientation) of ceiling 81 but not the precise shape of ceiling 81 (such as specific shapes/identities and positions of objects attached to ceiling 81 or holes/indentations in ceiling 81).

Mapping component 26 may classify second region 92, which includes wall 82, as being partially-mapped. One or more visual markers in second region 92 may indicate the general shape (including size, position and orientation) of wall 82 but not the precise shape of wall 82 (such as specific shapes/identities and positions of objects attached to wall 82 or holes/indentations in wall 82).

Mapping component may classify third region 93, which includes floor 83, vehicle 84, castle 85, and platform 86, as being fully-mapped. One or more visual markers in third region 93 may indicate the precise shape of one or more portions of third region 93 such that a fully-mapped virtual effect may be accurately placed with respect to a shape of the environment in third region 93. For example, a fully-mapped virtual effect may be accurately placed with respect to the specific shapes/identities and positions of one or more of floor 83, vehicle 84, castle 85, and/or platform 86 (e.g., a virtual solider on floor 83 approaching vehicle 84, a virtual pattern on castle 85, a virtual robot on platform 86, etc.).

Visual effects component 22 may be configured to, responsive to a region being classified as partially-mapped, select a partially-mapped visual effect for the overlay image to be presented in the region. Visual effects component 22 may include or retrieve information (for example, a database, etc.) that matches one or more visual markers to a particular partially-mapped visual effect. In some implementations, visual effects component 22 may be configured to select the partially-mapped visual effect based on a user input received through an input device, as described above. In some implementations, visual effects component 22 may be configured to select the partially-mapped visual effect based on a landmark, as described above.

Figure 10:
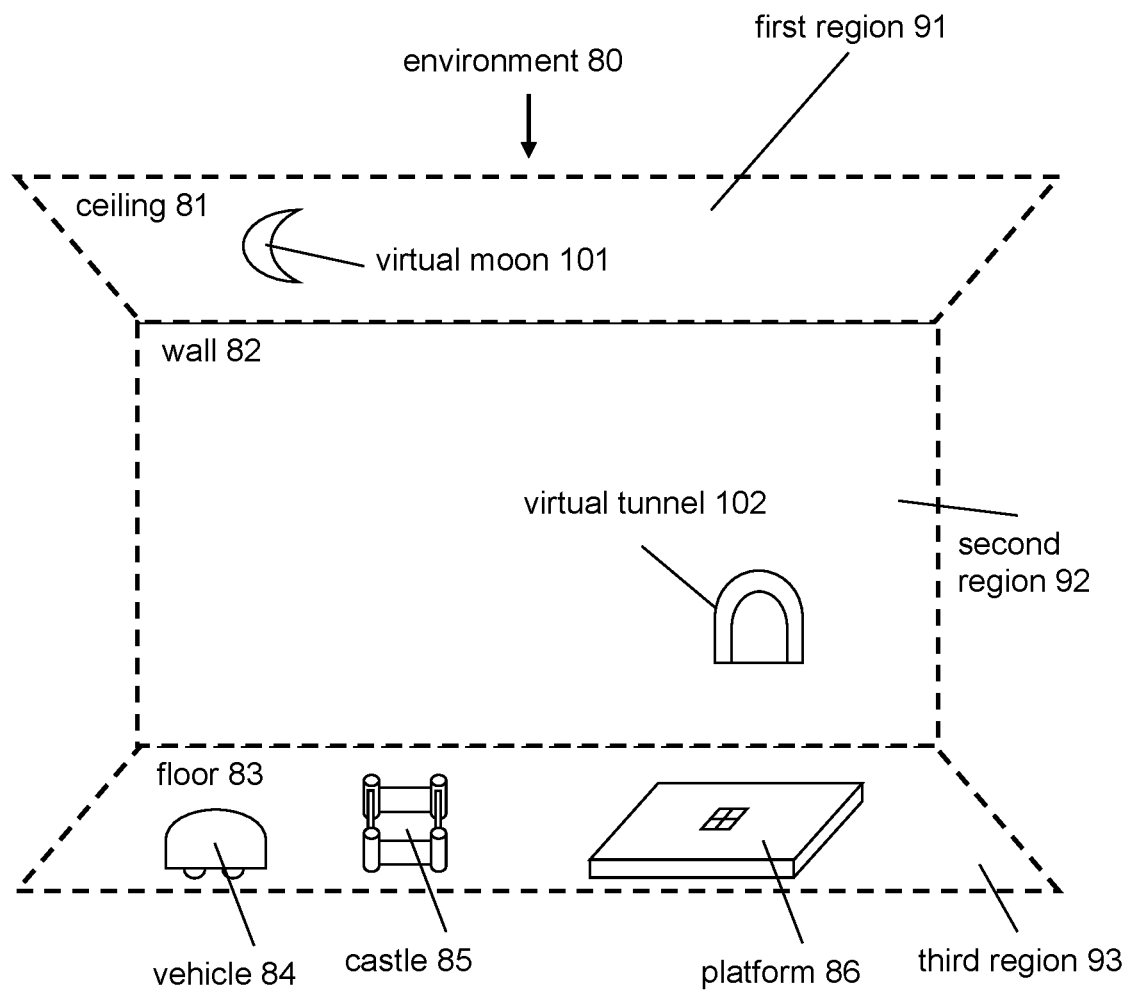
FIG. 10 illustrates an example of visual effects augmenting regions of an environment within a field of view of an image sensor.

For example, FIG. 10 illustrates an example of partially-mapped visual effects augmenting partially-mapped regions of in environment 80. For first region 91, virtual effects component 22 may select virtual moon 101 as the partially-mapped visual effect. Virtual moon 101 is a distant object that may be placed within first region 91 based on a general shape of the environment in first region 91. The position of virtual moon 101 may change over time so that it moves from one position in first region 91 to another position in first region 91.

For second region 92, virtual effects component 22 may select virtual tunnel 102 as the partially-mapped visual effect. The virtual tunnel 102 is a distant object that may be placed within second region 92 based on a general shape of the environment in second region 92.

As another example, mapping component 26 may classify the region between first region 91 and third region 93 as being partially-mapped. Visual effects component 22 may select a virtual environmental effect (e.g., virtual cloud, a virtual rain, a virtual dust storm, a virtual snow storm, a virtual wind, and/or other visual environmental effect) as the partially-mapped visual effect.

Visual effects component 22 may be configured to determine an overlay position and/or overlay orientation for the partially-mapped visual effect based on the positions and/or the orientations of the visual markers. Visual effects component 22 may include or retrieve information (for example, a database, etc.) that matches one or more visual markers to an overlay position and/or an overlay orientation for a partially-mapped visual effect. Visual effects component 22 may determine an overlay position and/or an overlay orientation for a partially-mapped visual effect based on a certain distance(s) from one or more visual markers and/or a certain orientation(s) with respect to one or more visual markers. For example, visual effects component 22 may determine an overlay position for a partially-mapped visual effect to be certain distances in front of, behind, above, below, to the right, and/or to the left of certain visual markers. Visual effects component 22 may determine an overlay orientation for a partially-mapped visual effect to be at certain orientations with respect to the visual markers.

For example, in FIG. 10, virtual effects component 22 may determine the overlay position of virtual moon 101 to be located on or below ceiling 81. The lateral position of virtual moon 101 may be determined based on time and/or other factors, or be randomly assigned to be within first region 91. Virtual effects component 22 may change the lateral position of virtual moon 101 over time to simulate the virtual moon 101 changing position as time goes by. As another example, virtual effects component 22 may determine the overlay position of virtual tunnel 102 to be located at a certain point on wall 82.

Overlay component 23 may be configured to determine an overlay image. The overlay image may include a partially-mapped visual effect determined by visual effects component 22. The partially-mapped visual effect may be placed within the overlay image according to the overlay position and overlay orientation for the partially-mapped visual effect.

Display component 24 may be configured to effectuate displaying of an overlay image on display 12. The displaying may be effectuated so that the partially-mapped visual effect appears to augment the appearance of the environment in the partially-mapped region.

Although processor 11, display 12, image sensor 13, light source 14, first motion and orientation sensor 15, second motion and orientation sensor 16, electronic storage 17 and patterned light source 19 are shown to be connected to a bus 18 in FIGS. 1-3, any communication medium may be used to facilitate interaction between any components of system 1, between any components of system 2, and between any components of system 3. One or more components of system 1 may communicate with each other through hard-wired communication, wireless communication, or both, one or more components of system 2 may communicate with each other through hard-wired communication, wireless communication, or both, and one or more components of system 3 may communicate with each other through hard-wired communication, wireless communication, or both. . . . For example, processor 11 may wirelessly communicate with display 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIGS. 1-3 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 (as shown in FIG. 1) may be configured to execute one or more of position and orientation component 21, visual effects component 22, overlay component 23, display component 24, and/or other components by software; hardware; firmware; some combination of software, hardware, and/or firmware; and/or other mechanisms for configuring processing capabilities on processor 11. Processor 11 (as shown in FIG. 2) may be configured to execute one or more of position and orientation component 21, visual effects component 22, overlay component 23, display component 24, light effects component 25, and/or other components by software; hardware; firmware; some combination of software, hardware, and/or firmware; and/or other mechanisms for configuring processing capabilities on processor 11. Processor 11 (as shown in FIG. 3) may be configured to execute one or more of position and orientation component 21, visual effects component 22, overlay component 23, display component 24, mapping component 26, and/or other components by software; hardware; firmware; some combination of software, hardware, and/or firmware; and/or other mechanisms for configuring processing capabilities on processor 11.

It should be appreciated that although components 21-26 are illustrated in FIGS. 1-3 as being co-located within a single processing unit, in implementations in which processor 11 comprises multiple processing units, one or more of components 21-26 may be located remotely from the other computer program components.

The description of the functionality provided by the different computer program components 21, 22, 23, 24, 25, and/or 26 described herein is for illustrative purposes, and is not intended to be limiting, as any of computer program components 20, 21, 22, 23, 24, 25, and/or 26 may provide more or less functionality than is described. For example, one or more of computer program components 20, 21, 22, 23, 24, 25, and/or 26 may be eliminated, and some or all of its functionality may be provided by other computer program components 20, 21, 22, 23, 24, 25, and/or 26. As another example, processor 11 may be configured to execute one or more additional computer program components that may perform some or all of the functionality attributed to one or more of computer program components 20, 21, 22, 23, 24, 25, and/or 26.

Although display 12 is depicted in FIGS. 1-3 as a single element, this is not intended to be limiting. Display 12 may include one or more displays in one or more locations.

Although image sensor 13 is depicted in FIGS. 1-3 as a single element, this is not intended to be limiting. Image sensor 13 may include one or more image sensors in one or more locations.

Although light source 14 is depicted in FIG. 1 as a single element, this is not intended to be limiting. Light source 14 may include one or more light sources in one or more locations.

Although first motion and orientation sensor 15 is depicted in FIG. 1 as single elements, this is not intended to be limiting. First motion and orientation sensor 15 may include one or more motion and orientation sensors in one or more locations.

Although second motion and orientation sensor 16 is depicted in FIG. 1 as single elements, this is not intended to be limiting. Second motion and orientation sensor 16 may include one or more gyroscopes in one or more locations.

Although patterned light source 19 is depicted in FIG. 2 as a single element, this is not intended to be limiting. Patterned light source 19 may include one or more patterned light sources in one or more locations.

The electronic storage media of electronic storage 17 may be provided integrally (i.e., substantially non-removable) with one or more components of system 1, system 2, or system 3 and/or removable storage that is connectable to one or more components of system 1, system 2, or system 3 via, for example, a port (e.g., a USB port, a Firewire port, etc.) or a drive (e.g., a disk drive, etc.). Electronic storage 17 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 17 may be a separate component within system 1, system 2, or system 3, or electronic storage 17 may be provided integrally with one or more other components of system 1, system 2, or system 3 (e.g., processor 11). Although electronic storage 17 is shown in FIGS. 1-3 as a single entity, this is for illustrative purposes only. In some implementations, electronic storage 17 may comprise a plurality of storage units. These storage units may be physically located within the same device, or electronic storage 17 may represent storage functionality of a plurality of devices operating in coordination.

Figure 11:
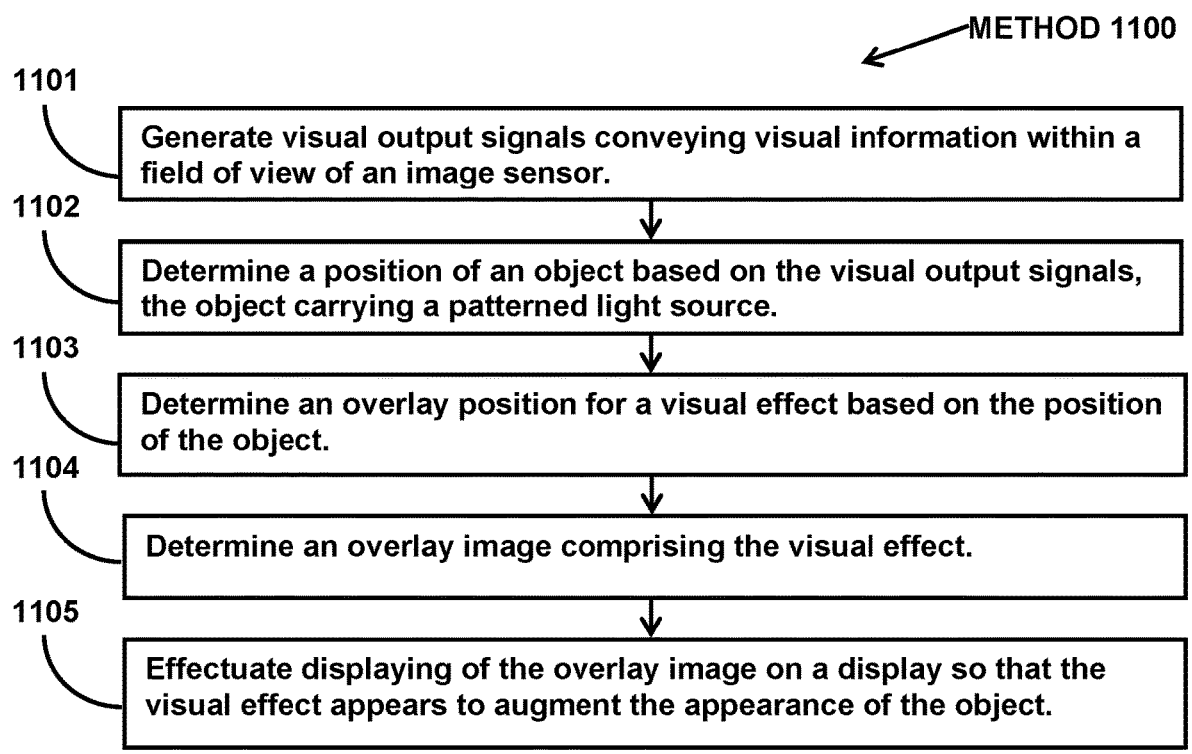
FIG. 11 illustrates a method for augmenting an appearance of an object.

FIG. 11 illustrates method 1100 for augmenting an appearance of an object. The operations of method 1100 presented below are intended to be illustrative. In some implementations, method 1100 may be accomplished with one or more additional operations not described, and/or without one or more of the operations discussed. In some implementations, two or more of the operations may occur substantially simultaneously.

In some implementations, method 1100 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 1100 in response to instructions stored electronically on one or more electronic storage mediums. The one or more processing devices may include one or more devices configured through hardware, firmware, and/or software to be specifically designed for execution of one or more of the operations of method 1100.

Referring to FIG. 11 and method 1100, at operation 1101, visual output signals conveying visual information within a field of view of an image sensor may be generated. Visual information may include one or more of an image, a video, and/or other visual information. In some implementations, operation 1101 may be performed by one or more sensors the same as or similar to image sensor 13 (shown in FIG. 2 and described herein).

At operation 1102, a position of an object may be determined based on the visual output signals. The object may carry a patterned light source. The patterned light source may indicate a reference point for the object that facilitates the determination of the position of the object. In some implementations, operation 1102 may be performed by a processor component the same as or similar to position and orientation component 21 (shown in FIG. 2 and described herein).

At operation 1103, an overlay position for a visual effect may be determined based on the position of the object. In some implementations, operation 1103 may be performed by a processor component the same as or similar to visual effect component 22 (shown in FIG. 2 and described herein).

At operation 1104, an overlay image comprising the visual effect may be determined. The visual effect may be placed within the overly image according to the position for the visual effect. In some implementations, operation 1104 may be performed by a processor component the same as or similar to overlay component 23 (shown in FIG. 2 and described herein).

At operation 1105, displaying of the overlay image on a display may be effectuated so that the visual effect appear augment the appearance of the object. In some implementations, operation 1105 may be performed by a processor component the same as or similar to display component 24 (shown in FIG. 2 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system to augment an appearance of an object, the system comprising:
   a display configured to display an overlay image;
   an image sensor configured to generate visual output signals conveying visual information within a field of view of the image sensor; and
   one or more processors configured by non-transitory machine-readable instructions to:
      determine a position of the object based on the visual output signals, the object carrying a patterned light source, the patterned light source indicating a reference point for the object that facilitates the determination of the position of the object, wherein the patterned light source emits a dynamic light pattern;
      responsive to detecting light surrounding the patterned light source that is similar in color and/or pattern of the dynamic light pattern, change the dynamic light pattern so that the dynamic light pattern is no longer similar in color and/or pattern to the light surrounding the patterned light source;
      determine an overlay position for a visual effect based on the position of the object;
      determine the overlay image comprising the visual effect, wherein the visual effect is placed within the overlay image according to the overlay position for the visual effect; and
      effectuate displaying of the overlay image on the display so that the visual effect appears to augment the appearance of the object.

2. The system of claim 1, wherein the patterned light source includes one or more light emitting diodes.

3. The system of claim 1, wherein the patterned light source is configured to generate multiple colors of light.

4. The system of claim 1, wherein the patterned light source includes a static light pattern.

5. The system of claim 1, wherein the dynamic light pattern is a light pattern that changes over time during operation of the patterned light source.

6. The system of claim 1, wherein:
   the object carries an orientation sensor, the orientation sensor configured to generate orientation output signals conveying orientation information of the object;
   the one or more processors are further configured by machine readable instructions to:
      determine an orientation of the object based on the orientation output signals; and
      determine an overlay orientation for the visual effect based on the orientation of the object,
      wherein the visual effect is further placed within the overlay image according to the overlay orientation for the visual effect.

7. The system of claim 1, further comprising:
an orientation sensor carried by the display, the orientation sensor configured to generate orientation output signals conveying orientation information of the display;
the one or more processors are further configured by machine readable instructions to:
determine an orientation of the display based on the orientation output signals; and
determine an overlay orientation for the visual effect based on the orientation of the display,
wherein the visual effect is further placed within the overlay image according to the overlay orientation for the visual effect.

8. The system of claim 1, wherein the visual effect includes an image and/or a video.

9. A method for augmenting an appearance of an object, the method comprising:
generating visual output signals conveying visual information within a field of view of an image sensor;
determining a position of the object based on the visual output signals, the object carrying a patterned light source, the patterned light source indicating a reference point for the object that facilitates the determination of the position of the object, wherein the patterned light source emits a dynamic light pattern;
responsive to detecting light surrounding the patterned light source that is similar in color and/or pattern of the dynamic light pattern, changing the dynamic light pattern so that the dynamic light pattern is no longer similar in color and/or pattern to the light surrounding the patterned light source;
determining an overlay position for a visual effect based on the position of the object;
determining an overlay image comprising the visual effect, wherein the visual effect is placed within the overlay image according to the overlay position for the visual effect; and
effectuating displaying of the overlay image on a display so that the visual effect appears to augment the appearance of the object.

10. The method of claim 9, wherein the patterned light source includes one or more light emitting diodes.

11. The method of claim 9, wherein the patterned light source is configured to generate multiple colors of light.

12. The method of claim 9, wherein the patterned light source includes a static light pattern.

13. The method of claim 9, wherein the dynamic light pattern is a light pattern that changes over time during operation of the patterned light source.

14. The method of claim 9, wherein the object carries an orientation sensor, the orientation sensor configured to generate orientation output signals conveying orientation information of the object, the method further comprising:
determining an orientation of the object based on the orientation output signals; and
determining an overlay orientation for the visual effect based on the orientation of the object,
wherein the visual effect is further placed within the overlay image according to the overlay orientation for the visual effect.

15. The method of claim 9, wherein the display carries an orientation sensor, the orientation sensor configured to generate orientation output signals conveying orientation information of the display, the method further comprising:
determining an orientation of the display based on the orientation output signals; and
determining an overlay orientation for the visual effect based on the orientation of the display,
wherein the visual effect is further placed within the overlay image according to the overlay orientation for the visual effect.

16. The method of claim 9, wherein the visual effect includes an image and/or a video.

17. A system for augmenting an appearance of an object, the system comprising:
a display configured to display an overlay image;
an image sensor configured to generate visual output signals conveying visual information within a field of view of the image sensor; and
one or more processors configured by non-transitory machine-readable instructions to:
determine a position of the object based on the visual output signals, the object carrying a patterned light source emitting a dynamic light pattern, the patterned light source indicating a reference point for the object that facilitates the determination of the position of the object;
responsive to detecting light surrounding the patterned light source that is similar in color and/or pattern of the dynamic light pattern, change the dynamic light pattern so that the dynamic light pattern is no longer similar in color and/or pattern to the light surrounding the patterned light source;
determine an overlay position for a visual effect based on the position of the object;
determine the overlay image comprising the visual effect, wherein the visual effect is placed within the overlay image according to the overlay position for the visual effect; and
effectuate displaying of the overlay image on the display so that the visual effect appears to augment the appearance of the object.

18. The system of claim 17, wherein the patterned light source includes one or more light emitting diodes.

* * * * *